United States Patent [19]
Behrens et al.

[11] Patent Number: 5,754,353
[45] Date of Patent: May 19, 1998

[54] CHANNEL QUALITY CIRCUIT IN A SAMPLED AMPLITUDE READ CHANNEL

[75] Inventors: Richard T. Behrens, Louisville; William R. Foland, Jr., Littleton, both of Colo.

[73] Assignee: Cirrus Logic, Inc., Fremont, Calif.

[21] Appl. No.: 340,939

[22] Filed: Nov. 17, 1994

Related U.S. Application Data

[63] Continuation-in-part of Ser. No. 87,617, Jul. 1, 1993, abandoned.
[51] Int. Cl.⁶ .................................................. G11B 5/09
[52] U.S. Cl. .................................................. 360/53; 360/51
[58] Field of Search ............................. 360/45, 46, 31, 360/53, 65, 75, 69; 364/554, 724.16, 724.19; 371/43, 21.2, 5.5, 4; 375/232, 292; 341/58

[56] References Cited

U.S. PATENT DOCUMENTS

| | | | |
|---|---|---|---|
| 5,121,263 | 6/1992 | Kerwin et al. | 360/53 |
| 5,220,466 | 6/1993 | Coker et al. | 360/46 |
| 5,243,473 | 9/1993 | Lee | 360/69 |
| 5,278,702 | 1/1994 | Wilson et al. | 360/51 |
| 5,355,261 | 10/1994 | Taratorin | 360/53 |
| 5,357,520 | 10/1994 | Arnett et al. | 371/21.2 |
| 5,359,607 | 10/1994 | Nguyen et al. | 371/5.5 |
| 5,381,359 | 1/1995 | Abbott et al. | 364/724.19 |
| 5,392,295 | 2/1995 | Coker et al. | 371/21.2 |
| 5,400,189 | 3/1995 | Sato et al. | 360/65 |
| 5,410,439 | 4/1995 | Egbert et al. | 360/75 |
| 5,426,541 | 6/1995 | Coker et al. | 360/65 |
| 5,490,091 | 2/1996 | Kogon et al. | 364/554 |
| 5,493,454 | 2/1996 | Ziperovich et al. | 360/45 |
| 5,544,178 | 8/1996 | Zook | 371/43 |

*Primary Examiner*—Aristotelis M. Psitos
*Assistant Examiner*—Patrick Wamsley
*Attorney, Agent, or Firm*—Howard H. Sheerin; Dan A. Shifrin

[57] ABSTRACT

A channel quality circuit, incorporated within a sampled amplitude read channel utilized in a magnetic storage system, for processing and accumulating performance data from the individual read channel components, wherein the performance data is used to calibrate the read channel to operate in a particular environment, to estimate the bit error rate of the storage system, and to detect defects in the magnetic medium. The channel quality circuit generates a test pattern of digital data which is written to the storage system. Then, as the test pattern is read from the storage system, the channel quality circuit accumulates performance data from the read channel components. The test pattern is used to generate expected samples and expected sample errors relative to the samples read by the read channel. Gating logic is programmed to accumulate only the particular performance data of interest. The channel quality circuit computes auto and cross-correlations, squared errors, and threshold comparisons. A defect detection filter detects particular defects in the media. In order to predict the bit error rate of the storage system, the channel quality circuit accumulates noise auto-correlation data, confidence metrics from a sequence detector, and cross-correlation of expected sample errors with actual sample errors.

12 Claims, 11 Drawing Sheets

| CURRENT STATE | LOCK SIGN | SAMPLE SIGN | TEST PATTERN | NEXT STATE | EXPECTED SAMPLE |
|---|---|---|---|---|---|
| x | 1 | 0 | x | a | x |
| x | 1 | 1 | x | b | x |
| a | 0 | x | 0 | a | 0 |
| a | 0 | x | 1 | b | -1 |
| b | 0 | x | 0 | b | 0 |
| b | 0 | x | 1 | a | +1 |

5,754,353

CHANNEL QUALITY CIRCUIT IN A SAMPLED AMPLITUDE READ CHANNEL

This application is a continuation-in-part of application Ser. No. 08/087,617 filed on Jul. 1, 1993 now abandoned.

FIELD OF INVENTION

The present invention relates to the control of magnetic storage systems for digital computers, and particularly, to a sampled amplitude read channel that employs a channel quality circuit for measuring the performance of a plurality of the read channel components.

CROSS REFERENCE TO RELATED APPLICATIONS AND PATENTS

This application is related to other co-pending U.S. patent applications, namely application Ser. Nos. 08/012,266 now U.S. Pat. No. 5,424,881 entitled "Synchronous Read Channel," 08/236,719 now abandoned entitled "Method and Apparatus for Calibrating a PRML Read Channel Integrated Circuit," and 08/313,491 now abandoned entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," 5,291,499 entitled "Method and Apparatus for Reduced-Complexity Viterbi-Type Sequence Detectors," 5,297,184 entitled "Gain Control Circuit for Synchronous Waveform Sampling," and 5,329,554 entitled "Digital Pulse Detector." All of the above-named patent applications and patents are assigned to the same entity, and all are incorporated herein by reference.

BACKGROUND OF THE INVENTION

In magnetic storage systems for computers, digital data serves to modulate the current in a read/write head coil so that a sequence of corresponding magnetic flux transitions are written onto a magnetic medium in concentric tracks. To read this recorded data, the read/write head passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by using a discrete time sequence detector in a sampled amplitude read channel. Discrete time sequence detectors are preferred over simple analog pulse detectors because they compensate for intersymbol interference (ISI) and, therefore, are less susceptible to noise. As a result, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, threshold crossing or derivative information, implemented in analog circuitry, is normally used to detect peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

Detection errors are also caused by intersymbol interference (ISI). Storage density is directly related to the number of pulses stored on the storage medium, and as the pulses are packed closer together in the effort to increase data density, they eventually interfere with each other resulting in intersymbol interference. This interference can cause a peak to shift out of its bit cell, or its magnitude to decrease, and result in a detection error. The ISI effect is reduced by decreasing the data density or by employing an encoding scheme to ensure that a minimum number of "0" bits occur between "1" bits. For example, a (d,k) run length limited (RLL) code constrains to d the minimum number of "0" bits between "1" bits, and to k the maximum number of consecutive "0" bits. A typical RLL code is a (1,7) 2/3 rate code which encodes 8 bit data words into 12 bit codewords to satisfy the (1,7) constraint.

Sampled amplitude detection, such as partial response (PR) with Viterbi detection, allows for increased data density by compensating for intersymbol interference. Unlike conventional peak detection systems, sampled amplitude recording detects digital data by interpreting, at discrete time instances, the actual value of the pulse data. The analog pulses are sampled at the baud rate and the digital data is detected from these discrete time sample values. A discrete time sequence detector, such as a Viterbi detector, interprets the discrete time sample values in context to determine a most likely sequence for the data. In this manner, the effect of ISI can be taken into account during the detection process thereby decreasing the probability of a detection error. After processing a consecutive sequence of sample values, the sequence detector compensates for ISI by selecting the most likely digital sequence associated with the sample values. This increases the signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp. 38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence Detection", *Digest of The Magnetic Recording*

Conference, August 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom' 90 IEEE Global Telecommunications Conference 1990*, San Diego, Calif., November 1990, pp. 1794–1799; and Abbott et al, "performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag' 90*.

Read Channel Calibration

Sampled amplitude read channels provide an increase in data density and are therefore preferred over the simpler pulse detection schemes. However, due to their complexity, the performance and accuracy of a sampled amplitude read channel depends on the performance and accuracy of each component therein. For instance, the accuracy of the sequence detector depends on how well the analog and digital filters equalize the pulses into an optimum shape, how well the automatic gain control circuit tracks the desired pulse amplitudes, and how well the timing circuitry synchronizes the sampling of the analog waveform. Additionally, a single read channel for use in many storage systems is desirable to avoid the cost of customization.

Thus, for optimal operation, the components of a sampled amplitude read channel must be tuned to the particular operating characteristics of the storage system. For example, the read channel can be tuned to operate according to the characteristics of a particular magnetic read head, to the particular height the head operates above the storage medium, or to the particular speed at which the magnetic storage medium is moving, as in a magnetic disk spinning. Also, the characteristics of the storage system and medium vary between each disk drive because there are slight but significant differences in manufacturing, and these characteristics degrade over time. Therefore, the read channel must be tuned to the operating characteristics of a particular drive as well as to the characteristics of the magnetic storage medium.

A further consideration is that defects in the magnetic medium, caused by defective material, manufacturing, or operation, can degrade such that part of the magnetic medium is no longer usable. By detecting defects in the medium, the storage system is prevented from using that part of the medium so that failures are avoided.

The prior art techniques for calibrating a read channel can be separated into two general groups, adaptive and non-adaptive systems. Adaptive calibration systems, such as those disclosed, in U.S. Pat. No. 5,132,988 and in U.S. Pat. No. 5,150,379, utilize characteristics of the data as it is being read to "adapt" the parameters of the read channel. Thus, the components of the read channel are continuously calibrated to operate at an optimum level. Adaptive techniques, however, require complex and expensive signal processing circuitry to implement the calibration algorithms. Further, due to instabilities and noise, these systems can exhibit systematic errors in converging to a proper value.

Non-adaptive calibration techniques are not as complex as adaptive systems, nor are they prone to non-convergence problems. For instance, in U.S. Pat. No. 5,121,260 a read channel optimization system is disclosed in which the characteristics of the storage system and storage medium are measured at the- time the storage system is manufactured. The optimization comprises writing and reading test data to and from the storage medium, and measuring system characteristics as the data is processed by the read channel. Well-known instrumentation for measuring the characteristics is used, such as oscilloscopes and spectrum analyzers, and the measurement data for each zone is stored at a specific location on the storage medium. During operation, the characteristic data is read from the storage medium and used to calibrate the read channel.

This technique, however, has drawbacks which are overcome by the present invention. One drawback is that it requires sophisticated and expensive equipment in order to measure the characteristic data. Further, automating the system of measuring and storing the data is difficult, and the number of measurement systems is limited. Yet another problem with this technique is that it does not compensate for changes over time, as the calibration is performed only during manufacturing. Finally, if either a storage system component or the storage medium is replaced, the system must be re-calibrated using the same sophisticated measuring equipment.

After the drive has been calibrated, its performance can be verified by checking the bit error rate. The bit error rate is defined as the ratio of bits detected incorrectly out of a total number of bits detected. One way to measure the bit error rate is to write a known test pattern to the disk and compare it with the pattern detected when read back. Since the bit error rate is typically very low (e.g., $10^{-9}$) the number of total bits detected has to be very large (e.g., $10^{11}$) which takes a significant amount of time. Therefore, it is desirable to provide a more efficient method for estimating the bit error rate without having to process such a large amount of data.

There are prior art methods for estimating the bit error rate. For example, U.S. Pat. No. 5,121,263 discloses a method that uses sample errors to estimate the bit error rate. Sample errors are computed as the difference between the sampled pulse data read by the channel and the expected sample values representative of the data originally recorded on the disk. However, the method for determining the expected sample values does not use the digital sequence written to the disk. Rather, the expected sample values are determined as a function of the samples read from the disk and are therefore subject to error. The estimated bit error rate, consequently, may also be incorrect.

In addition, the method disclosed in the '263 patent does not provide a means for acquiring measurement data other than the sample error value. In other words, measurement data from the individual components is not provided. Finally, particular portions of the measurement data cannot be selectively accumulated in order to characterize the entire data pulse. The method disclosed, then, is useful for estimating the bit error rate, but insufficient for calibrating the individual components of the read channel.

Another deficiency with the prior art is the inability to estimate the bit error rate by automatically generating a noise auto-correlation measurement within the read channel. A further deficiency is the inability to utilize the confidence metrics values from the sequence detector to estimate the bit error rate. Still further, the prior art does not provide a means for estimating the bit error rate by cross-correlating expected sample errors with measured sample errors when a single bit is shifted in a d=1 recording system.

It is a general object of the present invention to provide a means for automatically acquiring measurement data from the individual components of a read channel in order to: calibrate the read channel according to the characteristics of a particular storage system; estimate the bit error rate of the storage system; and predict defects in the storage medium in order to prevent system failures. It is a further object to avoid the complex and expensive signal processing techniques associated with adaptive calibration circuits, and to provide measurement data without using sophisticated measuring equipment. Another object is to provide a means for accurately generating expected sample values relative to the sample values read by the channel. Yet another object is to accumulate only a predetermined number of error values relative to the data read by the channel so that the entire data pulse can be characterized. Another object is to generate and accumulate, within the read channel, noise auto-correlation data, confidence metric values, and expected sample errors cross-correlated with measured sample errors, for use in estimating the bit error rate of the storage system.

SUMMARY OF THE INVENTION

The objects of the present invention are achieved by incorporating, within a sampled amplitude read channel, a channel quality circuit for acquiring performance data from the components of the read channel and generating error signals in response thereto. For instance, a timing error generated by the timing recovery circuit is accumulated by the measurement circuit and then used to tune the timing circuit to minimize the error. By programming the components with settings which correspond to minimum errors, the read channel can be optimized. In addition to calibrating the read channel components, during normal operation the measurement circuit is used to detect the bit error rate of the storage system, and to detect defects in the medium so that steps can be taken to prevent system failures.

The data processed by the read channel during calibration is generated by writing a known test pattern to the storage medium and then reading the data using the magnetic read head. Alternatively, the read data can be injected directly into the read channel from a signal generating device. In either method, the test data sequence is known so that an expected sample and bit sequence can be compared to the actual sample and bit sequence read by the channel. Thus, the measurement circuit includes both a means for generating and comparing expected sample values with actual sample values in order to generate sample errors, and a means for comparing the detected bit sequence with the test data sequence in order to generate bit errors. The sample errors or the bit errors can be used to estimate the storage system's bit error rate in order to verify the accuracy of the calibration.

The test data sequence is generated by a programmable linear feedback shift register (LFSR) which generates pseudo-random or repeating sequences. The seed value for the pseudo-random sequence and length of the repeated sequence are programmable.

An expected sample generating circuit utilizes the known test data sequence in conjunction with the sign of the sample value read by the channel to generate the expected sample values. A sync detected signal and a special 2T preamble synchronize the generation of expected samples with the samples being read by the channel. In this manner, errors in generating the expected sample values are avoided.

The present invention also provides programmable gating logic which enables the accumulation of measurement data within a predetermined window. This is accomplished by programming a start and stop value relative to the samples read by the channel. Consequently, the measurement circuit can be programmed to accumulate a predetermined range of data during acquisition or tracking modes independently. The gating logic also allows for periodic accumulation of data, which permits measurement of the entire isolated pulse. This is advantageous for the characterization of misequalization when calibrating the read channel and estimating bit error rates.

Yet another feature of the present invention is to estimate the bit error rate of the storage system by accumulating confidence metrics generated by the Viterbi sequence detector. The confidence metric is the measurement of the error or difference between the maximum likelihood sequence and the actual sequence, which is indicative of the bit error rate. Confidence metric measurements can be accumulated while in calibration mode using the known test pattern data, or during normal operation while reading arbitrary data from the storage system. Thus, the estimated-bit error rate computed from the confidence metrics is used to verify the accuracy of a calibration as well as to verify the normal operating performance of the storage system.

The measurement circuit further includes a means to arithmetically process the measured data, for example, by computing the auto-correlation and cross-correlation of selected inputs. The auto-correlation of the noise in the sampled signal, represented by the sample error values, can be computed automatically to determine the bit error rate of the system. Furthermore, the discrete time equalizing filter can be calibrated by cross-correlating the filter delay register values with the expected sample values in order to determine the optimum filter coefficients.

The means for processing the measured data also includes a defect scan filter which enhances the noise due to defects in the medium. The filter's impulse response is matched to the signature of the noise in order to amplify the noise in the presence of a defect. A plurality of defect scan filters, with impulse responses matched to corresponding noise signatures, can be programmably selected. A defect scan which uses each filter separately can determine the presence and location of specific types of medium defects.

To process the measured data further, a bit-shift estimator cross-correlates the measured sample errors with the expected sample errors when a single bit shift error occurs in $d=1$ recording. Similar to the confidence metrics technique, the bit-shift estimator can be used to estimate the bit error rate during calibration mode as well as normal operation. The bit-shift estimator is normally used to estimate the bit error rate of a sampled amplitude read channel that has a $d>0$ constraint since computing the confidence metric for these channels is more complicated.

BRIEF DESCRIPTION OF THE DRAWINGS

The above and other aspects and advantages of the present invention will be better understood by reading the following detailed description of the invention in conjunction with the drawings wherein.

DETAILED DESCRIPTION OF THE PREFERRED EMBODIMENT

Sampled Amplitude Recording Channel

Figure 1:
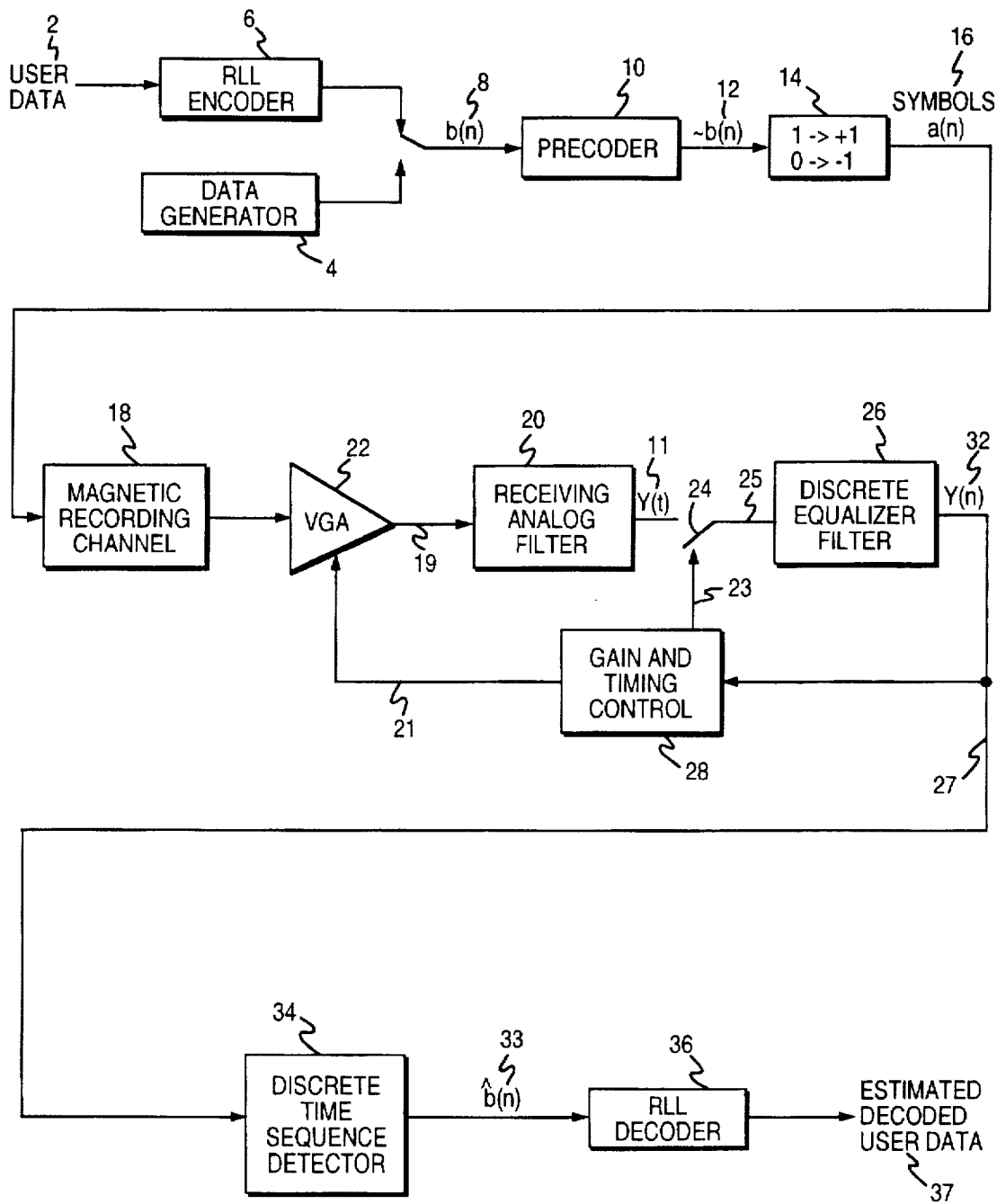
FIG. 1 is a block diagram of a conventional sampled amplitude recording channel.

FIG. 1 is a detailed block diagram of a conventional sampled amplitude read/write recording channel. During a write operation, either user data 2 or preamble data from a data generator 4 (normally 2T preamble data) is written onto the medium. A RLL encoder 6 encodes the user data 2 into a binary sequence b(n) 8 according to a (d,k) RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. The symbols a(n) 16 modulate the current in the recording head coil at the baud rate 1/T to record the binary sequence onto the magnetic medium.

When reading the binary sequence back, a variable gain amplifier 22 adjusts the amplitude of the analog read signal 19, and an analog filter 20 provides initial equalization toward the desired response. A sampling device 24 samples the analog read signal Y(t) 11 from the analog filter 20, and a discrete time filter 26 provides further equalization toward the desired response. In partial response recording, for example, the desired response may be selected from Table 1.

The equalized sample values 32 are applied over line 27 to decision directed gain and timing control 28 for adjusting the amplitude of the read signal and the frequency and phase of the sampling device 24, respectively. Timing recovery adjusts the frequency of sampling device 24 over line 23 in order to synchronize the equalized samples 32 to the waveform so that the effect of intersymbol interference is minimized (see co-pending U.S. patent application Ser. No. 08/701,572 entitled "Improved Timing Recovery For Synchronous Partial Response Recording"). Gain control adjusts the gain of variable gain amplifier 22 over line 21. The equalized samples Y(n) 32 are sent to a discrete time sequence detector 34, such as a-maximum likelihood (ML) Viterbi sequence detector, to detect an estimated binary sequence ^b(n) 33. An RLL decoder 36 decodes the estimated binary sequence ^b(n) 33 into estimated user data 37. In the absence of errors, the estimated binary sequence ^b(n) 33 is equal to the recorded binary sequence b(n) 8, and the decoded user data 37 is equal to the recorded user data 2.

Data Format

Figure 2A:
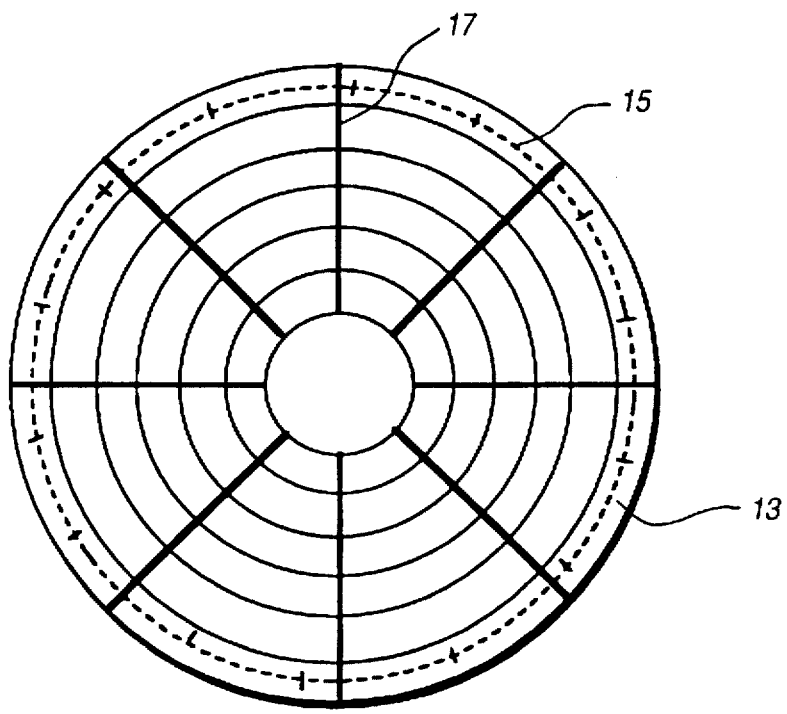
FIG. 2A shows an exemplary data format of a magnetic disk having a plurality of concentric tracks where each track contains a plurality of sectors.
Figure 2B:
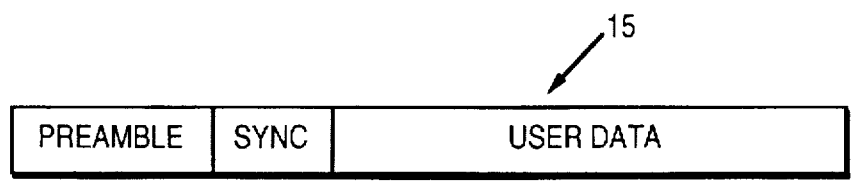
FIG. 2B shows an exemplary format of a sector.

FIG. 2A shows an exemplary data format of a magnetic medium comprising a plurality of concentric data tracks 13 wherein each data track 13 is comprised of a plurality of sectors 15, and wherein a plurality of servo fields 17 are embedded in the sectors. A disk controller processes the servo fields 17 to verify the track and sector position of the read/write head. Additionally, the disk controller processes servo bursts within the servo field 17 to keep the head aligned over the desired track 13 while writing and reading data. FIG. 2B shows the format of a sector 15 comprising a training preamble, a sync mark, and user data. Timing recovery uses the training preamble to acquire the correct sampling frequency and phase, and the sync mark signals the beginning of user data. See co-pending U.S. patent application Ser. No. 08/701,572 entitled "Improved Timing Recovery For Synchronous Partial Response Recording".

Channel Quality

Figure 3:
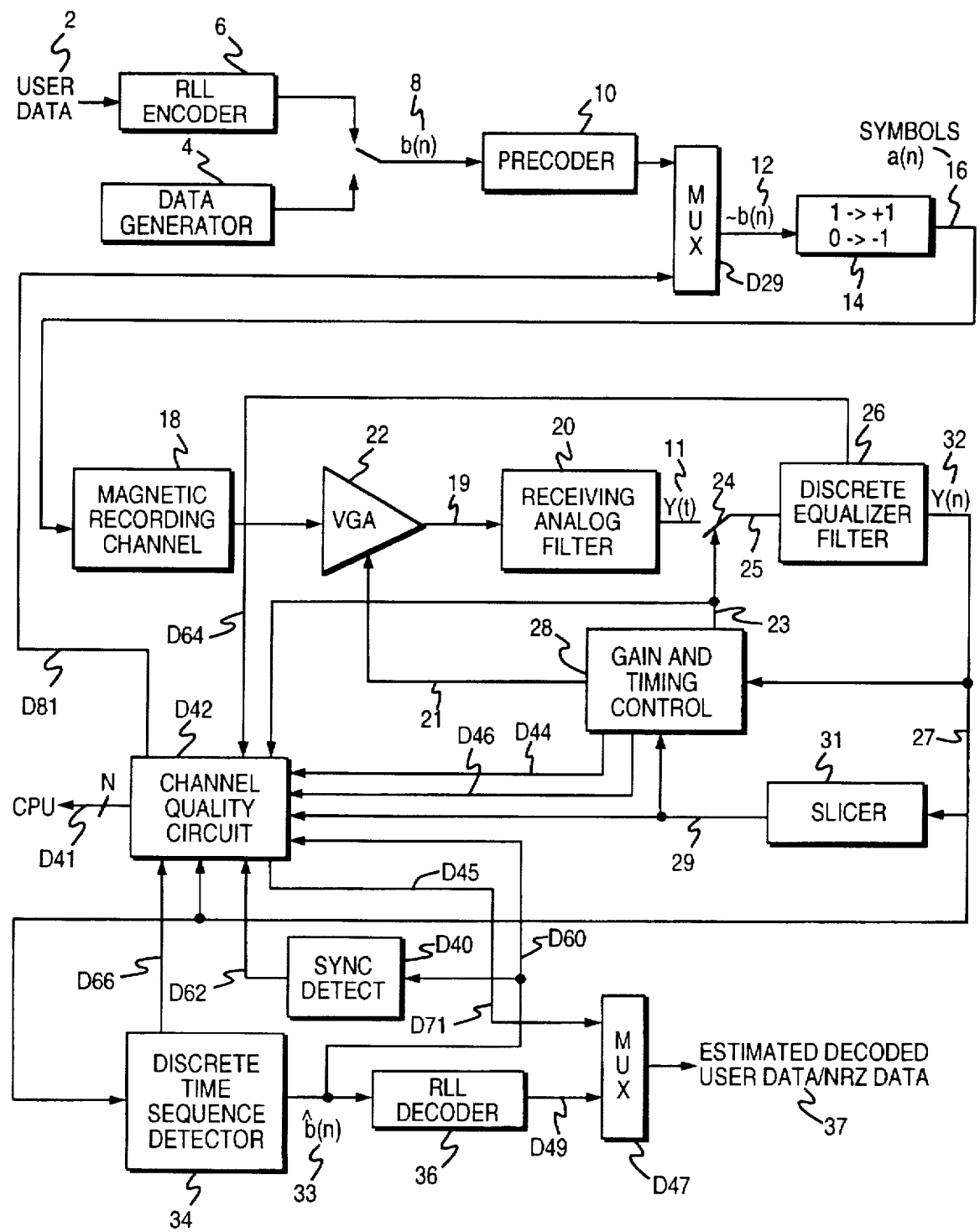
FIG. 3 is a block diagram of a sampled amplitude recording channel comprising the channel quality circuit of the present invention.

FIG. 3 shows a sampled amplitude read channel comprising the channel quality circuit D42 of the present invention. Also shown is a sync mark detector D40 for generating a sector sync mark detected signal D62; a slicer 31 for generating estimated sample values 29; and a multiplexer D47 for selecting as the NRZ output data from the channel quality circuit D42 over line D45 or data from the RLL decoder 36 over line D49.

Figure 4:
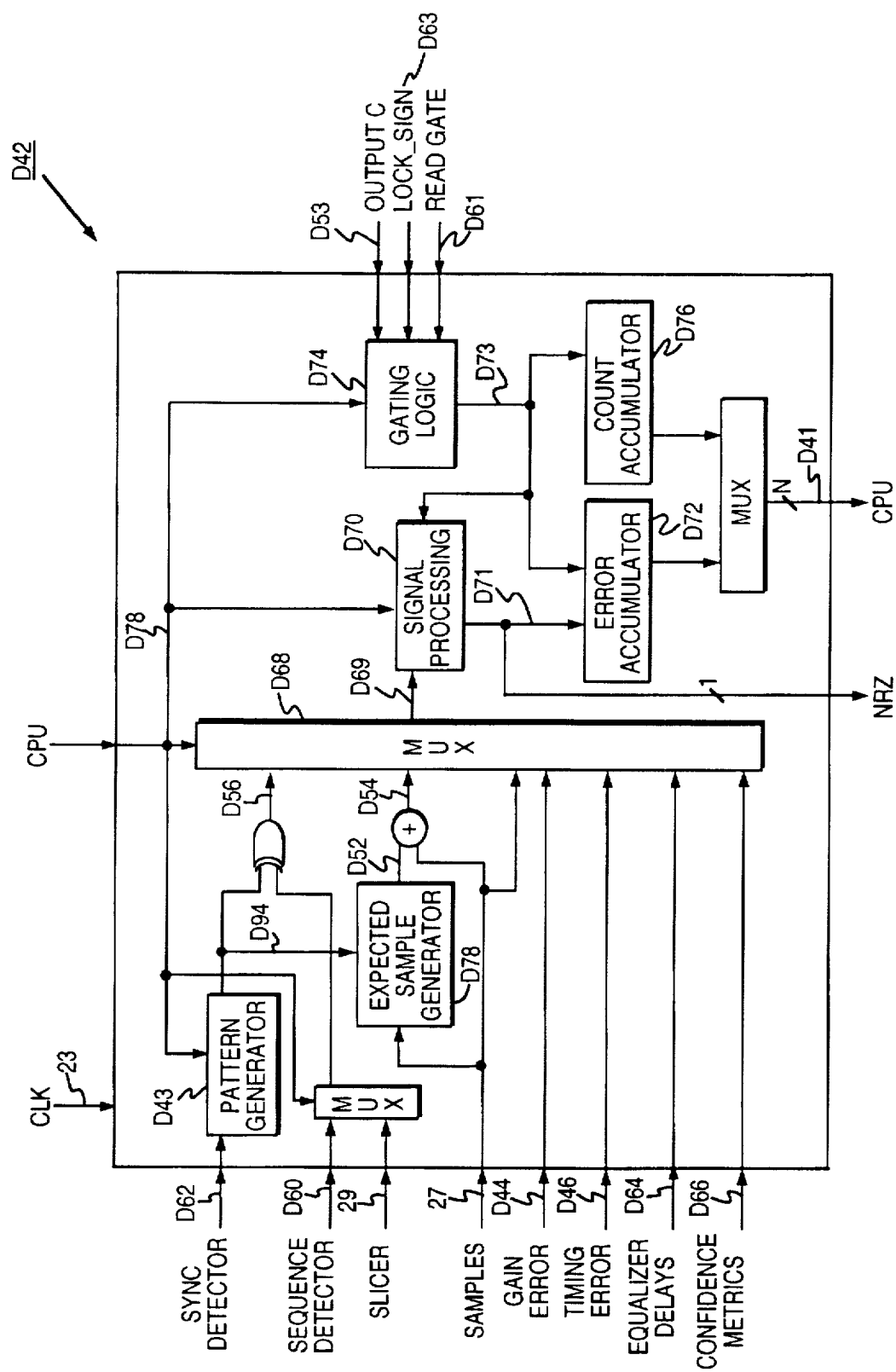
FIG. 4 is a block diagram of the channel quality circuit which has various input signals from the read channel components.

Referring now to FIG. 4, the channel quality circuit D42 accumulates the error values used during calibration. A pattern generator D43 generates a test sequence D94 of digital data written to the storage medium and then read back by the read head and processed by the read channel during calibration. An expected sample generator D78 generates expected samples based on the test data from the pattern generator D43. The expected samples D52 are subtracted from the actual samples 27 to generate a sample error signal D54. A bit error rate signal D56 is generated by comparing the expected test pattern D94 from the pattern generator D43 to the detected sequence generated by either the slicer 31 over line 29 or the sequence detector 34 over line D60.

Other read channel component measurements include a gain error D44 from the automatic gain control circuit 28, a timing error D46 from the timing control circuit 28, delay register values D64 from the discrete time equalization filter 26, and the confidence metrics D66 from the discrete time sequence detector 34. The measurement data from the read channel components are passed through multiplexer D68 to the signal processing circuit D70. An error value D71, typically comprised of multiple bits, is computed from the measurement data and accumulated in error accumulator D72. Gating logic D74 controls which error values are accumulated and updates an error count in count accumulator D76. Gating logic D74 also responds to an OutputC signal D53. When enabled, OutputC D53 causes accumulation of the confidence metrics D66 (as described below).

The measurement circuit is clocked from the output of the timing control circuit 23 in order to synchronize the expected sample generation and error accumulation to the sampling frequency. A microprocessor (not shown) controls, over bus D78, the programmable aspects of the pattern generator D43, multiplexers, signal processing D70, and gating logic D74 as are herein after described.

The microprocessor reads the error D72 and count D76 accumulators (typically N bits wide) over line D41. The bit error signal D56 and threshold signal D123 (the threshold signal D123 is described in reference to FIG. 7) can also be applied over line D71 to the NRZ data line 37 in order to determine the location of errors within the data stream. This is useful, for instance, in detecting the exact location of a medium defect.

Test Pattern And Expected Sample Generator

Figure 5A:
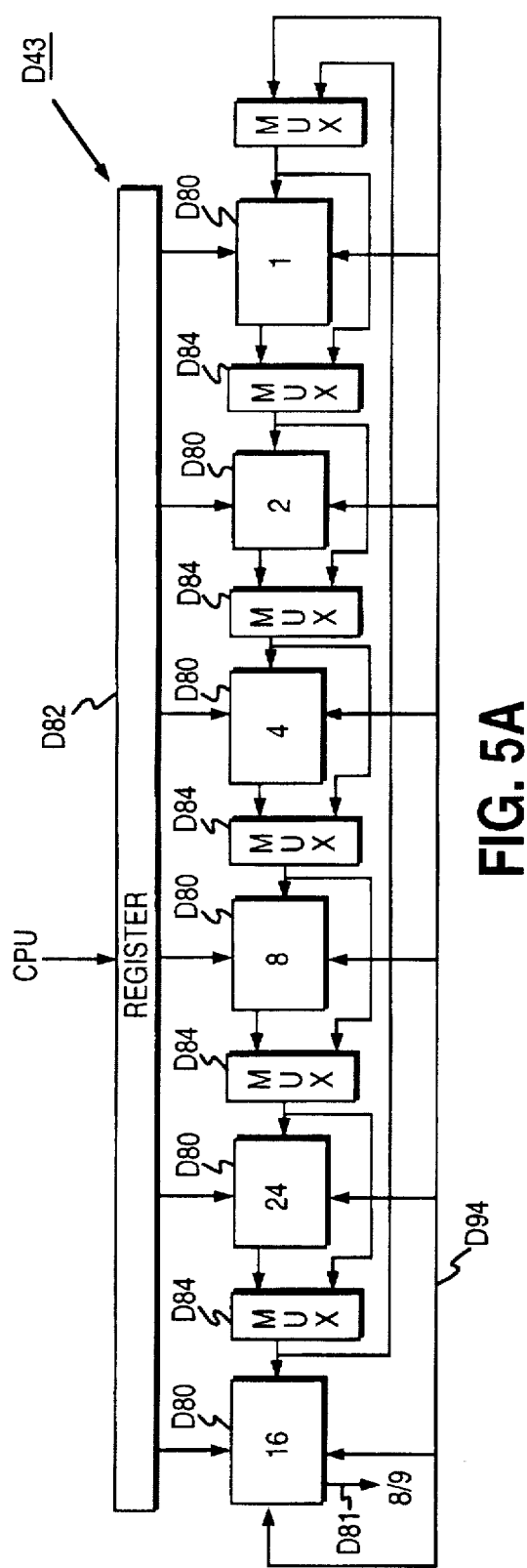
FIGS. 5A and 5 are a block diagrams of the channel quality pattern generator circuit for generating pseudo-random and repeating sequences of test data.
Figure 5B:
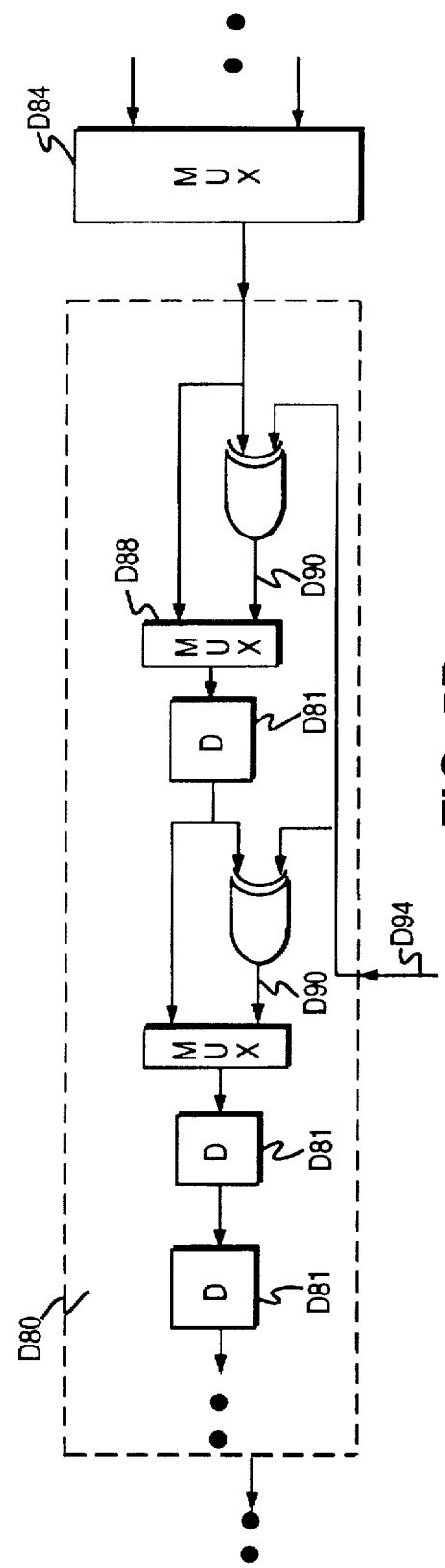

FIGS. 5A and 5B illustrate the preferred embodiment for implementing the pattern generator D43 of the channel quality circuit. The pattern generator is programmably configured into a linear feedback shift register (LFSR) to generate pseudo-random sequences, or it is configured into a ring shift register to generate a repeating pattern sequence. Logic blocks D80 implement various stages of the pattern generator and can be bypassed, through multiplexers D84, to change the length of the pseudo random or repeated sequence.

In pseudo-random mode, the register D82 is programmed with a seed value for the sequence, and the seed value is loaded into the corresponding stages D80 of the pattern generator. The data is shifted from right to left and outputted in parallel from the furthest left stage D80 (the stage of length 16). A parallel output D81 from the farthest left stage is in either 9-bit RLL encoded format or 8-bit un-encoded format. A serial output D94 of the farthest left stage is fed back to the other stages in order to implement the LFSR. This is also the output D94 of the pattern generator D43 shown in FIG. 4.

As shown in FIG. 5B, each stage D80 comprises a predetermined number of memory elements D81 which store one bit of data. Multiplexers D88 are programmed to either pass the bit from the previous memory element straight through to implement the ring shift register or XOR D90 the previous bit with the feed back bit D94 to implement the LFSR. The polynomial for implementing the LFSR is fixed; not all of the memory elements are preceded by the multiplexer D88 and XOR gate D90.

Referring again to FIG. 4, during read back of the test pattern from the storage system, the pattern generator D43 is disabled until the sync detect D62 is active, indicating the beginning of the sequence. Once sync detect D62 is active, the pattern generator is clocked by the output of the timing control circuit over line 23 to synchronize the pattern re-generation with the pattern read from the disk. In this manner, the bit errors D56 are computed as the difference between the bit sequence detected by the read channel and the test pattern.

Expected samples D52, corresponding the samples read from the storage medium, are generated using the test pattern D94 from the test pattern generator D43 and a state diagram of the discrete time sequence detector 34. That is, the expected samples D52 are generated as the expected input to the sequence detector 34, given the test pattern is the expected output of the detector 34.

Figure 6A:
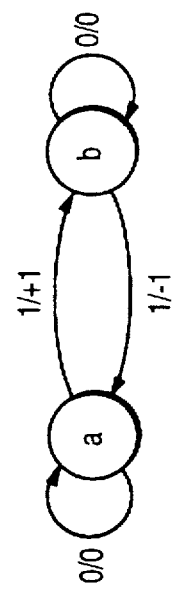
FIGS. 6A, 6B and 6C are the state diagram, logic table, and logic circuit depicting how the expected samples in a partial response class-IV read channel are generated for use in channel quality.

The state diagram for one interleave of a PR4 read channel, as shown in FIG. 6A, has only two states, a and b, representing the even or odd dicode sequence. See Roy D. Cideciyan, Francois Dolivo, Walter Hirt, and Wolfgang Schott, "A PRML System for Digital Magnetic Recording", IEEE Journal on Selected Areas in Communications, Vol. 10 No. 1, January 1992, pp.38-56. A transition from one state to the other occurs when a "1" bit is detected in the sequence.

Figure 6B:
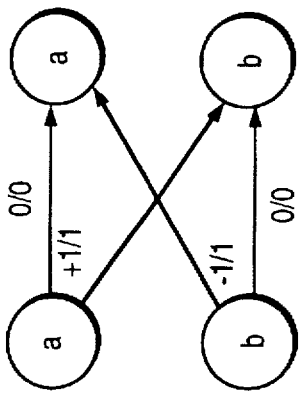
Figure 6C:
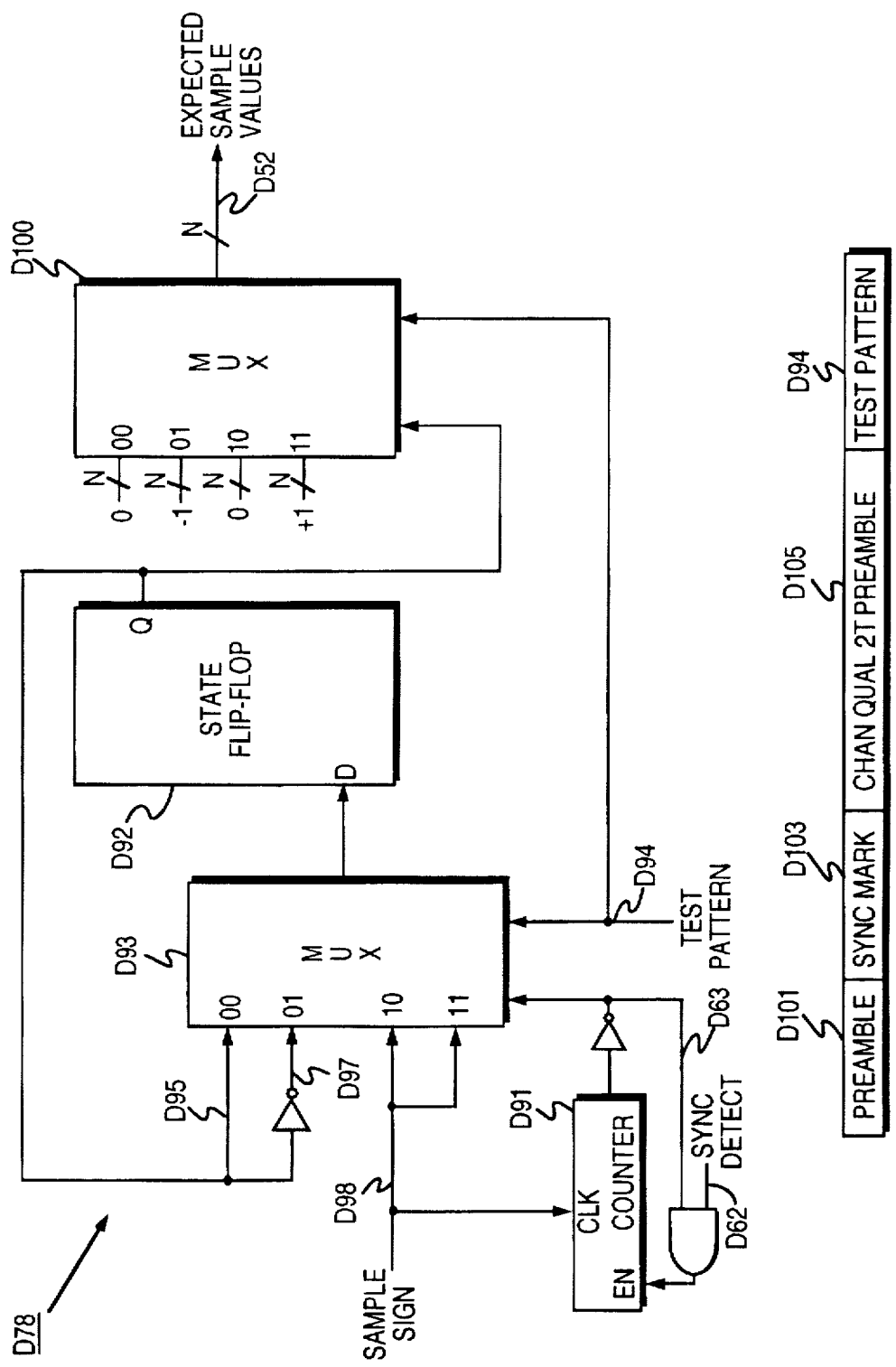

Before the sequence of expected samples can be generated, the starting state, a or b, must be determined. To accomplish this, the beginning of the test pattern comprises a channel quality 2T preamble D105 as shown in FIG. 6C. A 2T preamble has the form (110011001100...) and corresponds to the write current in the head coil with 1=positive current and 0=negative current. This preamble maximizes the output of the recording channel and results in a known sinusoidal read back signal. Consequently, the sign of the samples can be used to determine the starting state, a or b, as depicted in the state table of FIG. 6B.

As shown in FIG. 6C, an acquisition preamble D101 (such as a 2T preamble) is first read by the channel to adjust the gain and timing control 28. Next, the sync mark D103 is detected and the sync detect D62 signal activated to signify the beginning of the channel quality preamble D105. Counter D91 is enabled by the sync detected D62 signal and is clocked by the sample sign D98 in order to count the number of expected transitions in the channel quality 2T preamble D105. While counting the channel quality 2T preamble transitions, a lock sign D63 is active and the sample sign D98 (0=positive, 1=negative) is selected through multiplexer D93 as the input to a state flip-flop D92. The output D95 of the state flip-flop D92 represents the states a and b (a=1, b=0).

When counter D91 reaches terminal count, the lock sign D63 signal inactivates which disables counter D91 and selects, as the input to the state flip-flop D92, the current state D95 or the inverse state D97 as determined by the test pattern D94 rather than the sample sign. As shown in the state table of FIG. 6B, for each '0' bit in the test pattern the state remains the same, and for each '1' bit the state changes. The current state and current test pattern bit are used to select the N bit expected sample value D52 through multiplexer D100. The expected sample value D52, with respect to the current state and test pattern bit, is shown in the state table of FIG. 6B.

Channel Quality Signal Processing

Figure 7:
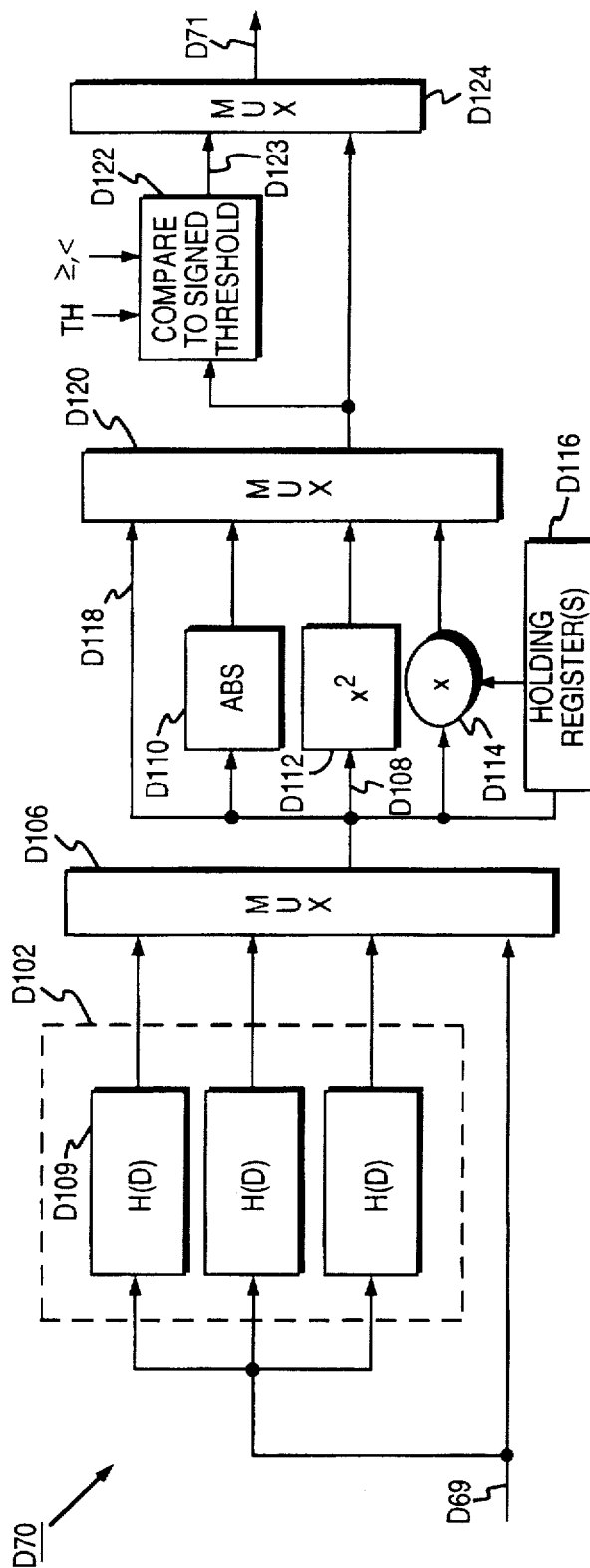
FIG. 7 is a block diagram for the channel quality signal processing circuit.

FIG. 7 shows the block diagram for the signal processing circuit D70 of the measurement circuit. The measurement signal to be processed, provided at the output of multiplexer D68, is input to the signal processing circuit D70 over line D69.

The signal processing includes a bank of discrete time filters D102 where the impulse response of each filter substantially matches the signature of noise in the sampled data caused by a particular type of medium defect. The effect is to amplify the noise, represented by the sample error values, such that medium defects can be more readily detected. The filter matched to the particular defect of concern is selected using multiplexer D106. At least one of the defect filters 11 can be configured into a bit-shift estimator circuit (discussed in reference to FIG. 11) for estimating the bit error rate in a d=1 read channel. Refer to U.S. Pat. No. 5,563,746 entitled "Real Time Media Defect Scanning In A Sampled Amplitude Read Channel" for a detailed description of how medium defects affect the read signal, as well as a detailed description of a related defect detection technique.

Multiplexer D106 passes either the filtered measurement signal or the unfiltered measurement signal to arithmetic processing circuitry over line D108. Arithmetic processing abilities include computing the absolute value D110, squaring D112, and multiplying D114 by a value previously stored in a holding register(s) D116. The holding register(s)

Figure 8:
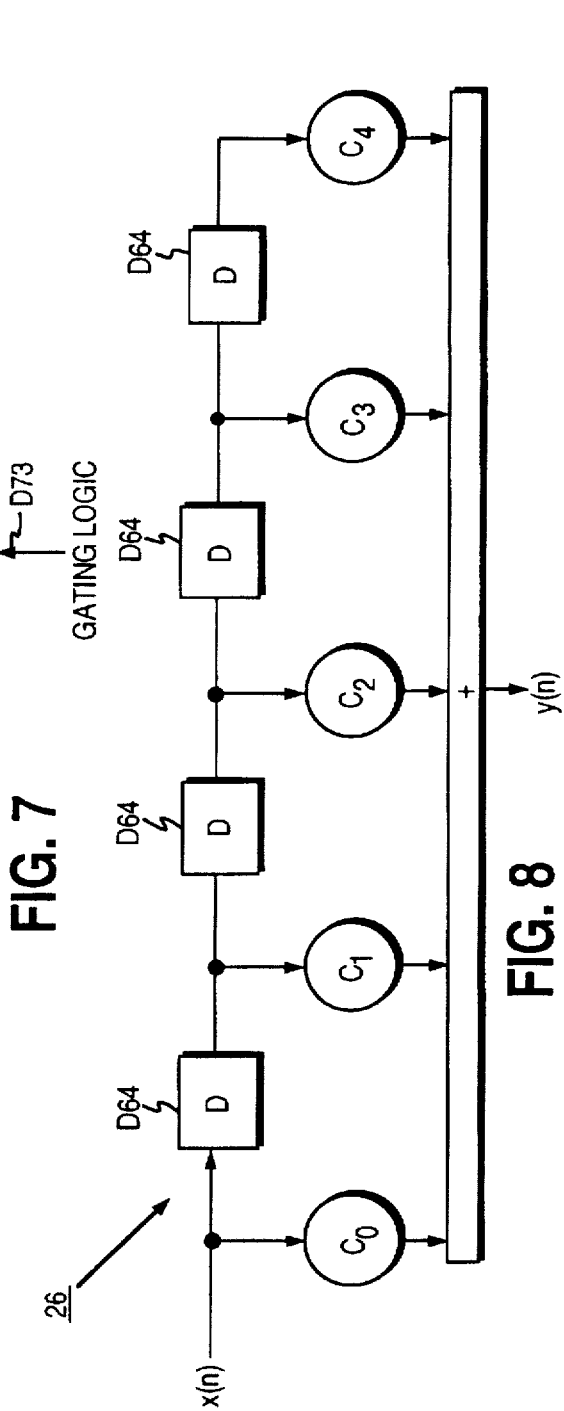
FIG. 8 is an example digital equalization filter where the values stored by the tap delays are processed by the channel quality circuit in order to calibrate the filter.

D116 and multiplier D114 are used to calculate autocorrelation and cross-correlation values, which are then used to calibrate the read channel components and to predict bit error rates. For instance, the discrete time equalization filter shown in FIG. 8 is calibrated by processing the delay register values D64 in a least mean square (LMS) algorithm using auto-correlation and cross-correlation computations.

Multiplexer D120 is used to select the desired arithmetically processed signal, or the un-processed signal D118. The output of multiplexer D120 is compared to a signed threshold D122 and the compare signal D123 sent to the error accumulator D72 over line D71 and, optionally, to the NRZ output 37. Alternatively, the output of multiplexer D120 is passed directly through multiplexer D124 to the NRZ output or error accumulator. As described earlier, the NRZ output is one bit and can be used to detect the location of bit errors D56 and threshold events D123 in the data stream.

Channel Quality Gating Logic

Figure 9:
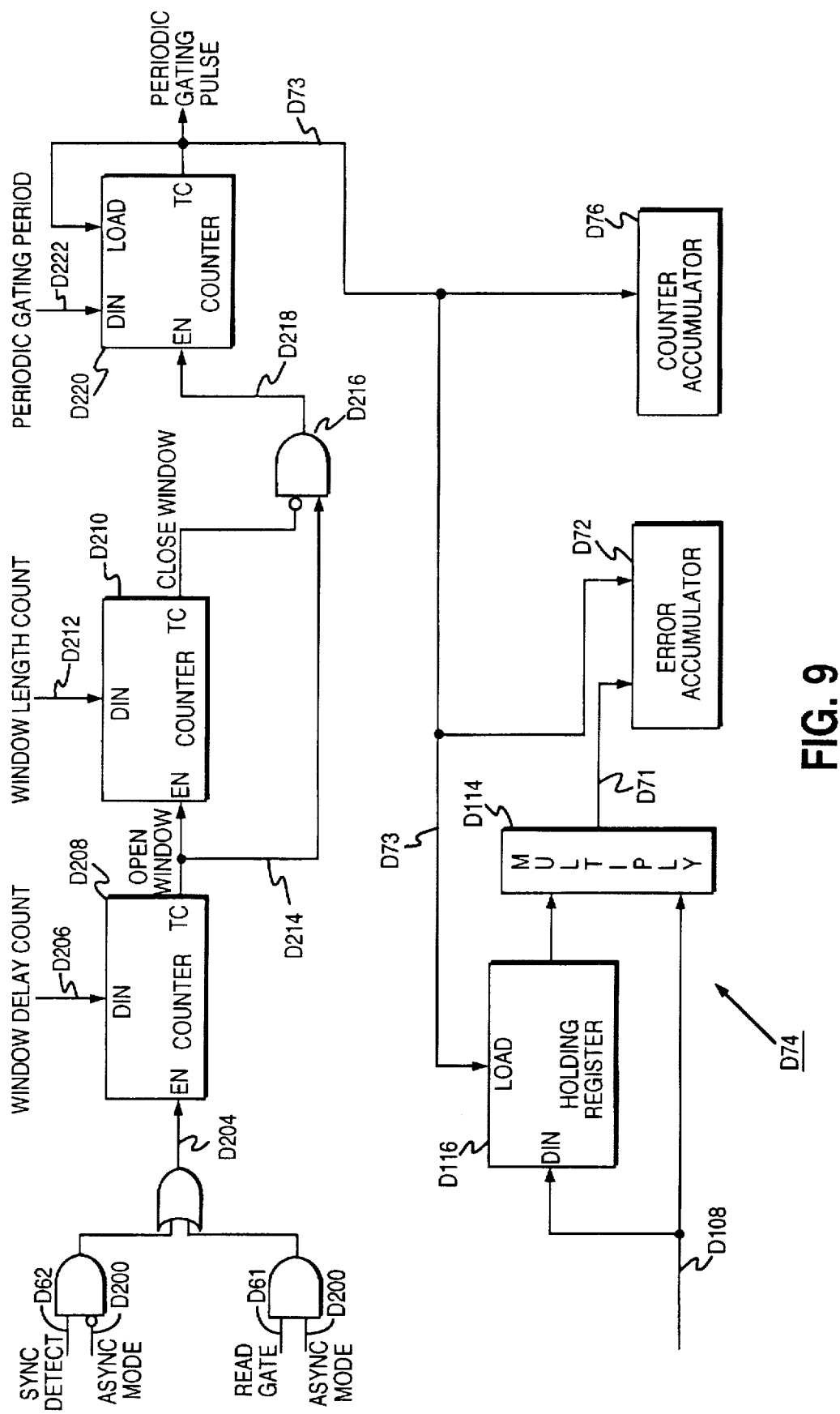
FIG. 9 is a logic diagram of the window logic and periodic gating logic of the channel quality circuit.

The error D72 and count D76 accumulators and the holding register(s) D116 are controlled by the gating logic D74, an implementation of which is shown in FIG. 9. Counters D208 and D210 implement window logic to accumulate the error values within a predetermined window of sample values processed by the read channel. The window logic is activated according to an async mode D200 signal together with a read gate D61 and sync detected D62 signals. When in async mode, the window logic is active as soon as the read gate D61 is active indicating that the read channel is processing sample values read from the storage medium. Otherwise, the window logic is active synchronous with the sync detected signal D62 which signifies the start of the test pattern D94.

Counter D208 stores a delay count, which represents the number of samples to be processed by the channel before the start of the accumulation window. A delay count is loaded into the counter over line D206, and the counter is enabled over line D204. When the delay count is reached, counter D210, which stores the count for the window duration D212, and counter D220, which stores a periodic gating count D222, are activated.

Counter D220 is loaded with a periodic gating count D222, which specifies an interval for accumulating the error values and for loading the holding register(s) D116. If the periodic gating count is one, then the error and count accumulators store an error value for every sample processed by the read channel during the window duration. If the periodic gating count is, for example, three, then an error and count value is accumulated at every third sample processed by the read channel. Periodic gating allows characterization of the entire data pulse by varying the accumulation interval.

The gating logic enables accumulation of error values until the duration count in counter D212 is reached, disabling counter D220 over line D218.

Bit Error Rate Using Confidence Metrics

Yet another signal processed by the measurement circuit of the present invention is the confidence metric D66 generated by the sequence detector 34. The confidence metric is used to estimate the bit error rate in order to verify the accuracy of a calibration and to monitor the performance of the storage system while in normal operation. During sequence detection, the detector computes a pre-transition (Cpre) and post-transition (Cpost) metric value. The confidence metric D66 processed by the measurement circuit is updated, when a transition is detected, to either Cpre, Cpost, or the minimum of Cpre and Cpost. The Cpre and Cpost values are generated by the sequence detector 34 according to Table D1 during normal operation and Table D2 when guided by the test pattern D94 during calibration mode.

In Tables D1 and D2, the first column, Last T, represents the polarity of the last transition. The second column of Table D1, Xk, is the estimated value of the current input sample when reading arbitrary data during normal operation. During calibration, Xk in Table D2 is the expected sample value corresponding to the test pattern. The third column shows the computation of Cpre according to Last T and Xk where TH and TL are, respectively, the high and low thresholds of the sequence detector 34. The value for Cpre is updated only when Xk is non-zero. The fourth column shows the computation of Cpost as MaxPos (the maximum possible value) when Xk is non-zero, and as the minimum of the previous Cpost and the difference between the sample value Yk and the threshold when Xk is zero. The fifth column, OutputC, is a flag indicating that a confidence metric D66 is computed and output at each transition as either Cpre, Cpost, or the minimum of Cpre and Cpost.

Figure 10:
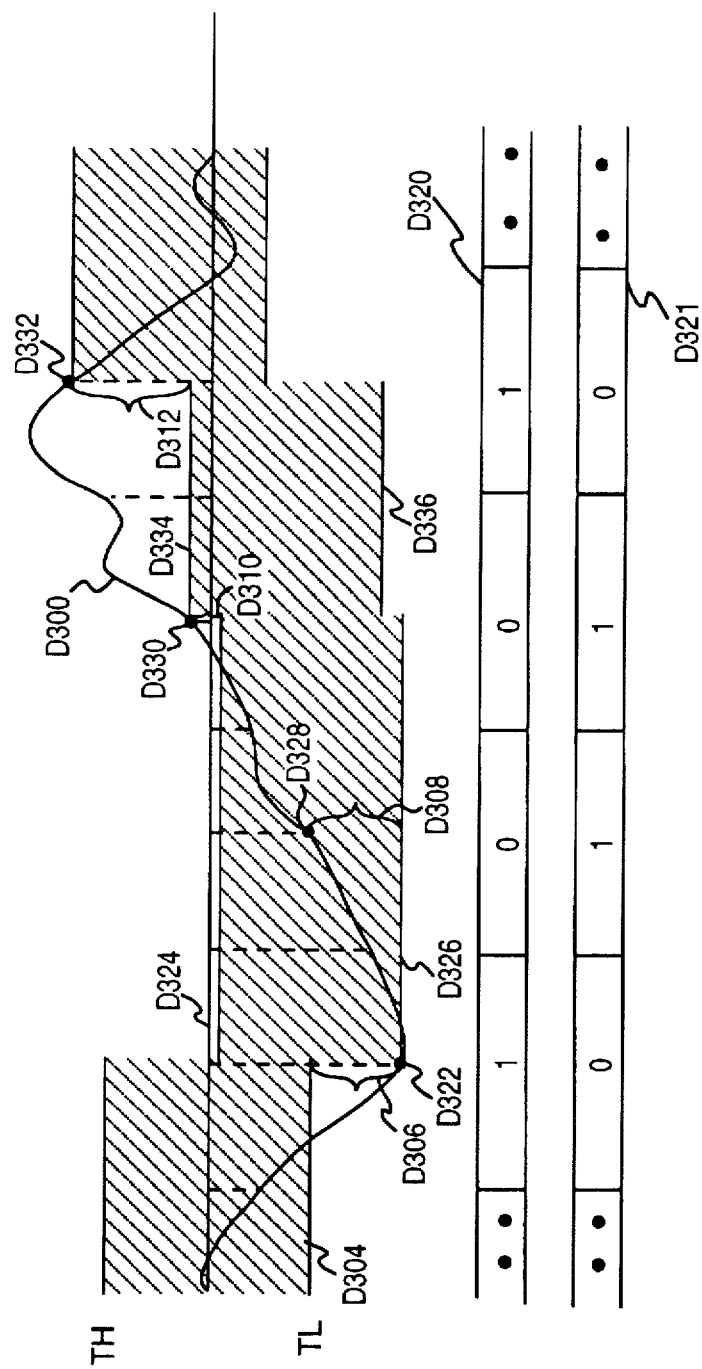
FIG. 10 is an example sampled analog read signal depicting the channel quality confidence metric computation for arbitrary data mode and for guided mode.

The computation of Cpre and Cpost can be understood with reference to FIG. 10. This figure shows the continuous time analog signal D300 generated by the read head, and corresponding discrete time samples processed by a PR4 read channel. In a PR4 read channel, the samples are processed in the even and odd interleaves separately. Therefore, the samples shown in FIG. 10 are described in relation to one of the interleaves. Below each sample value is the corresponding binary value of the bit sequence detected D320 during normal operation, and the bit sequence D321 for the test pattern D94 during calibration mode.

The detected bit sequence D320 in relation to the sample values illustrates the operation of the interleaved Viterbi detector 34 during normal operation when reading arbitrary data. The operation of the Viterbi detector 34 is described in relation to Table D1.

The sampled analog signal D300 has a negative and positive transition. The negative transition is detected during normal operation when the interleaved sample value Yk D322 exceeds the lower threshold D304 and the estimated sample value Xk is −1. Cpre is updated to TL-Yk D306 according to row 3 of Table D1, and the thresholds TH D302 and TL D304 are adjusted, according to the sliding threshold Viterbi algorithm, to new thresholds TH D324 and TL D326. Since the next interleaved sample value D328 is within the thresholds D324 and D326, the estimated value Xk is 0 and Cpost is updated to Yk-TL D308 according to row 5 of Table D1. The next interleaved sample value D330 exceeds the upper threshold D324 and the estimated sample value Xk is +1. The confidence metric D66 is then updated to Cpre, Cpost or the minimum of Cpre and Cpost as programmed by the microprocessor, and the gating logic D74 is enabled by OutputC D53 so that the confidence metric D66 is accumulated. Cpre is updated, according to row 6 of Table D1, to Yk-TH D310. The thresholds D324 and D326 are updated, according to the Viterbi algorithm, to new thresholds TH D334 and TL D336. The next interleaved sample value D332 again exceeds the upper threshold value D334 and the estimated sample value Xk is +1. Since the polarity of the estimated transition has not changed, the confidence metric D66 is not gated by OutputC D53 and is therefore not accumulated. However, Cpre is update to Yk-TH D312 according to row 1 of Table D1.

The test pattern bit sequence D321 in relation to the sample values illustrates the operation of the interleaved Viterbi detector 34 during calibration mode when the test pattern D321 is used to guide the detector. In guided mode, consecutive non-zero expected samples of the same polarity will not occur. Therefore rows 1 and 4 of Table D1 are omitted from Table D2. The operation of the detector in guided mode is described in relation to Table D2.

The first interleaved sample value D322 exceeds the TL threshold D304 and would normally be detected as a "1" bit. The test pattern D321, however, is a "0" bit, which prevents detection of the transition. The thresholds TH D302 and TL D304 are still adjusted, according to the sliding threshold Viterbi algorithm, to new thresholds TH D324 and TL D326. The next sample value D328 does not exceed the thresholds D324 or D326, however, the test pattern D321 is a "1" bit so a transition is detected. The error is reflected in the confidence metric Cpre which is updated to TL-Yk D308 according to row 2 of Table D2. Cpre in this case is a negative value which indicates the presence of the error. The next interleaved sample value D330 exceeds the TH threshold D324 and the transition is detected correctly since the test pattern is also a "1" bit. OutputC D53 is enabled and the confidence metric is accumulated. The next interleaved sample value D332 again exceeds the TH threshold D334, but the transition is not detected since the test pattern is a "0" bit. The error is reflected in the confidence metric Cpost which is updated to TH-Yk D312 according to row 1 of Table D2. In this case Cpost is also a negative value indicating the presence of the error.

When a transition is detected in either normal or guided mode, OutputC D53 enables accumulation of the condifence metric D66. Comparator D122 of FIG. 6 can also be programmed in order to accumulate only the confidence metric values that exceed a predetermined threshold. This allows for even greater flexibility in optimizing the bit error estimation process.

Bit Error Rate Using Bit Shift Estimator

For EPR4 or EEPR4 d=1 minimum run length constraint recording (meaning there must be at least one "0" bit between successive "1" bits), it is more complicated to compute the confidence metric. Thus, rather than use the confidence metrics, one of the defect filters D102 can be configured into a bit-shift estimator D109 (shown in FIG. 7 and in detail in FIG. 11) to estimate the bit error rate. In a d=1 channel, the sequence detector 34 will never allow the detected sequence to violate the d=1 constraint. However, an error caused by a bit shifting in the sequence can still occur without violating the constraint. Such an error, for example, occurs when a data sequence of "001" or "100" is detected as "010". The bit-shift estimator D109 detects these bit-shift errors which is indicative of the system's bit error rate.

Figure 11:
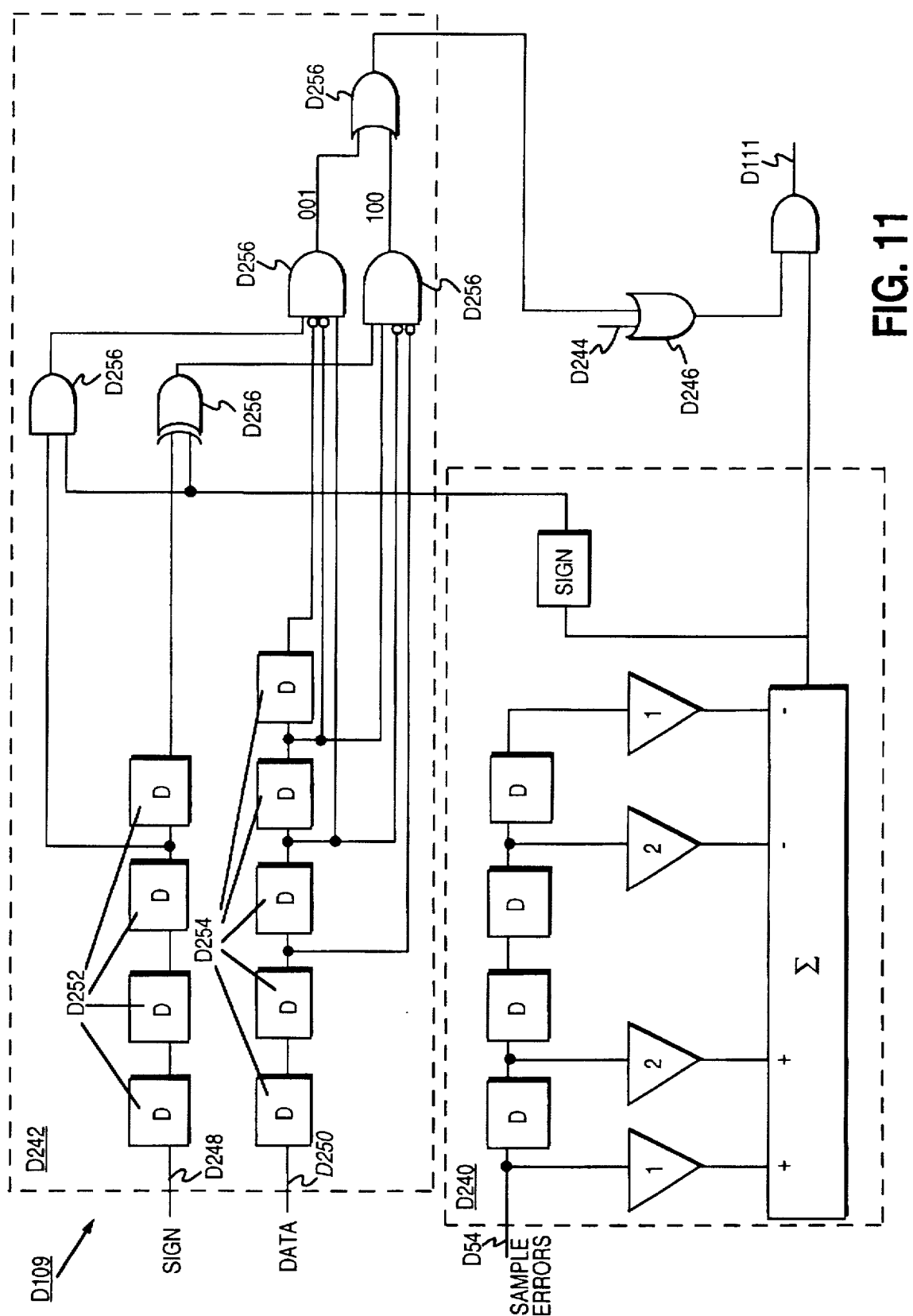
FIG. 11 is a logic diagram of the channel quality bit-shift estimator used for estimating bit error rates in d=1 recording.

As shown in FIG. 11, the bit-shift estimator D109 can be implemented as an FIR filter D240 for filtering the sample error values D54. The filter's impulse response (e.g., 1, 2, 0, -2, -1 for EEPR4) is substantially matched to the sample errors caused by a "1" bit shifting one place in the data stream without violating the d=1 constraint. In this manner, the expected sample errors resulting from a bit shift event are cross-correlated with the actual sample errors. This cross-correlation is indicative of the bit error rate.

To configure for bit error rate estimation, the bit-shift estimator is activated through OR-gate D246 by setting line D244 low. If line D244 is active, then the bit-shift estimator is operable as a defect scan filter D102. Once activated, additional bit shift detector logic D242 shown in FIG. 11 enables the output of the bit-shift estimator at the correct time. Estimated or expected data D250 from the sequence detector 34 or test pattern generator D43, respectively, is input into five delay registers D254, and the most significant bit (the sign D228) of the data is input into four delay registers D252. Logic gate D256 enable the output of the bit-shift estimator according to specific conditions.

The output D111 of the FIR filter D240 is enabled only when the test pattern sequence is '001' and the sign of the expected sample values matches the sign output D241 of the FIR filter D240, or when the test pattern sequence is '100' and the sign of the expected sample values is opposite the sign output D241 of the FIR filter D240. The presence of a leading or trailing pair of zeros indicates that the pulse in question can shift left or right by one place without violating the d=1 constraint. The operation of the bit-shift estimator is understood with reference to Table D3.

In Table D3, the heading indicates the direction of the bit shift (LEFT or RIGHT). Row 1 shows the bit-shifted sequence detected by the read channel and row 2 shows the expected sequence from the test pattern. The actual signal samples generated by the bit-shifted sequence (in the absence of other errors or noise) are shown in row 3 with the expected sample values corresponding to the expected sequence from the test pattern shown in row 4. The sample error values, computed by subtracting the expected samples from the actual samples, are shown in row 5. Accordingly, the magnitude of the sample error sequence matches the impulse response of the FIR filter (1, 2, 0, -2, -1) when a bit shift occurs in a "100" or "001" sequence. As shown in row 6, the output of the filter is highly positive or negative when filtering the sample error sequence corresponding to a bit-shift error.

By incorporating the measurement circuit of the present invention into a read channel, the components of the read channel can be easily calibrated to operate in a particular environment. Further, the measurement circuit provides the necessary processing to estimate the bit error rate of the storage system from the confidence metrics of the sequence detector, from the auto-correlation of the sample errors in the sampled signal, and from cross-correlating the expected sample errors with the actual sample errors in the sampled signal. Additionally, the measurement circuit includes a defect detection filter for enhancing noise, caused by particular types of medium defects, in the sampled signal. Thus, defects in the medium can be more readily detected and system failures avoided.

The objects of the invention have been fully realized through the embodiment disclosed herein. Those skilled in the art will appreciate that the aspects of the invention can be achieved through various embodiments without departing from the spirit and scope of the invention. The particular embodiment disclosed is illustrative and not meant to limit the scope of the invention as appropriately construed by the following claims.

TABLE 1

| Channel | Transfer Function | Dipulse Response |
| --- | --- | --- |
| PR4 | $(1 - D)(1 + D)$ | 0, 1, 0, -1, 0, 0, 0, ... |
| EPR4 | $(1 - D)(1 + D)^2$ | 0, 1, 1, -1, -1, 0, 0, ... |
| EEPR4 | $(1 - D)(1 + D)^3$ | 0, 1, 2, 0, -2, -1, 0, ... |

TABLE D1

| Last T | Xk | next Cpre | next Cpost | OutputC |
|---|---|---|---|---|
| +1 | +1 | Yk – TH | MaxPos | 0 |
| +1 | 0 | Hold | min(Cpost, TH – Yk) | 0 |
| +1 | –1 | TL – Yk | MaxPos | 1 |
| –1 | –1 | TL – Yk | MaxPos | 0 |
| –1 | 0 | Hold | min(Cpost, Yk – TL) | 0 |
| –1 | +1 | Yk – TH | MaxPos | 1 |

TABLE D2

| Last T | Xk | next Cpre | next Cpost | OutputC |
|---|---|---|---|---|
| +1 | 0 | Hold | min(Cpost, TH – Yk) | 0 |
| +1 | –1 | TL – Yk | MaxPos | 1 |
| –1 | 0 | Hold | min(Cpost, Yk – TL) | 0 |
| –1 | +1 | Yk – TH | MaxPos | 1 |

TABLE D3

| Shift Direction | LEFT | | | | | RIGHT | | | | | LEFT | | | | | RIGHT | | | | |
|---|---|---|---|---|---|---|---|---|---|---|---|---|---|---|---|---|---|---|---|---|
| Detected Sequence | 0 | 1 | 0 | 0 | 0 | 0 | 1 | 0 | 0 | 0 | 0 | 1 | 0 | 0 | 0 | 0 | 1 | 0 | 0 | 0 |
| Expected Sequence | 0 | 0 | 1 | 0 | 0 | 1 | 0 | 0 | 0 | 0 | 0 | 0 | 1 | 0 | 0 | 1 | 0 | 0 | 0 | 0 |
| Actual Samples | 0 | +1 | +3 | +3 | +1 | 0 | 0 | +1 | +3 | +3 | +1 | 0 | –1 | –3 | –3 | –1 | 0 | 0 | –1 | –3 | –3 | –1 |
| Expected Samples | 0 | 0 | +1 | +3 | +3 | +1 | +1 | +3 | +3 | +1 | 0 | 0 | 0 | –1 | –3 | –3 | –1 | –1 | –3 | –3 | –1 | 0 |
| Sample ERrors | 0 | +1 | +2 | 0 | –2 | –1 | –1 | –2 | 0 | –2 | –1 | 0 | –1 | –2 | 0 | +2 | +1 | +1 | +2 | 0 | –2 | –1 |
| Filter Output | | +10 | | | | | | –10 | | | | | –10 | | | | | | +10 | | | |

We claim:

1. A channel quality circuit integrated into a sampled amplitude read channel for reading data from a magnetic medium, the read channel detects digital data from a sequence of discrete time sample values generated by sampling an analog signal from a magnetic read head positioned over the magnetic medium, the channel quality circuit for monitoring the performance of a plurality of components of the sampled amplitude read channel, said channel quality circuit comprising:

(a) a plurality of measurement inputs for receiving a plurality of measurement signals generated by at least one of the read channel components;

(b) signal processing circuitry, responsive to the measurement signals, for generating at least one error value; and (c) an output for outputting the at least one error value to a microcontroller for use in calibrating at least one of the read channel components.

wherein:

the read channel is a type PRML class-IV channel and comprises at least one sliding threshold Viterbi detector responsive to the sample values;

the sliding threshold Viterbi detector comprises a sliding threshold; and the measurement signals comprise a confidence metric value proportional to a difference between sample values processed by the Viterbi detector and the sliding threshold.

2. A channel quality circuit integrated into a sampled amplitude read channel for reading data from a magnetic medium, the read channel detects digital data from a sequence of discrete time sample values generated by sampling an analog signal from a magnetic read head positioned over the magnetic medium, the channel quality circuit for monitoring the performance of a plurality of components of the sampled amplitude read channel, said channel quality circuit comprising:

(a) a plurality of measurement inputs for receiving a plurality of measurement signals generated by at least one of the read channel components;

(b) signal processing circuitry, responsive to the measurement signals, for generating at least one error value; and (c) an output for outputting the at least one error value to a microcontroller for use in calibrating at least one of the read channel components.

wherein the signal processing circuitry comprises a squared value generator.

3. A channel quality circuit integrated into a sampled amplitude read channel for reading data from a magnetic medium, the read channel detects digital data from a sequence of discrete time sample values generated by sampling an analog signal from a magnetic read head positioned over the magnetic medium, the channel quality circuit for monitoring the performance of a plurality of components of the sampled amplitude read channel, said channel quality circuit comprising:

(a) a plurality of measurement inputs for receiving a plurality of measurement signals generated by at least one of the read channel components;

(b) signal processing circuitry, responsive to the measurement signals, for generating at least one error value; and (c) an output for outputting the at least one error value to a microcontroller for use in calibrating at least one of the read channel components.

wherein the signal processing circuitry comprises a comparator for comparing an operand value, responsive to the measurement signals, to a predetermined threshold value.

4. A channel quality circuit integrated into a synchronous PRML class-IV read channel for reading data from a magnetic medium, the read channel detects digital data from a sequence of discrete time sample values generated by sampling an analog signal from a magnetic read head positioned over the magnetic medium using at least one sliding threshold Viterbi detector having at least one sliding threshold, said channel quality circuit comprising:

(a) a confidence metric accumulator for accumulating a confidence metric value proportional to the difference between the sample values processed by the Viterbi detector and the sliding threshold; and (b) a count accumulator for accumulating a count value representing a number of confidence metric values accumulated.

5. The channel quality circuit as recited in claim 4, wherein the confidence metric is proportional to the value selected from the group consisting of a pre-metric value and a post-metric value, wherein:

(a) the pre-metric value is computed, when a current sample value processed by the Viterbi detector is outside of the sliding threshold, responsive to a difference between the current sample value and the sliding threshold; and (b) the post-metric value is computed, when a current sample value processed by the Viterbi detector is within the sliding threshold, responsive to a minimum of a previous post-metric value and a difference between the current sample value and the sliding threshold.

6. The channel quality circuit as recited in claim 4, further comprising an expected sample value generator for generating expected sample values relative to the sample values read by the read channel, wherein the confidence metric is proportional to the value selected from the group consisting of a pre-metric value and a post-metric value, wherein:

(a) the pre-metric value is computed, when an expected sample value is non-zero, responsive to a difference between a current sample value and the sliding threshold; and (b) the post-metric value is computed, when an expected sample value is zero, responsive to a minimum of a previous post-metric value and a difference between the current sample value and the sliding threshold.

7. A method for measuring performance data from a plurality of components in a sampled amplitude read channel for reading data from a magnetic medium, the read channel detects digital data from a sequence of discrete time sample values generated by sampling an analog signal from a magnetic read head positioned over the magnetic medium, said method for measuring comprising the steps of:

(a) measuring, within the read channel, a plurality of measurement signals generated by a read channel component:

(b) processing the measurement signals to generate at least one error value: and (c) outputting the error value to a microcontroller for use in calibrating at least one of the read channel components, wherein:

the read channel is a type PRML class-IV channel and comprises at least one sliding threshold Viterbi detector responsive to the sample values;

the sliding threshold Viterbi detector comprises a sliding threshold; and the measurement signals comprise a confidence metric value proportional to a difference between sample values processed by the Viterbi detector and the sliding threshold.

8. A method for measuring performance data from a plurality of components in a sampled amplitude read channel for reading data from a magnetic medium, the read channel detects digital data from a sequence of discrete time sample values generated by sampling an analog signal from a magnetic read head positioned over the magnetic medium, said method for measuring comprising the steps of:

(a) measuring, within the read channel, a plurality of measurement signals generated by a read channel component;

(b) processing the measurement signals to generate at least one error value; and (c) outputting the error value to a microcontroller for use in calibrating at least one of the read channel components, wherein the step of processing the measurement signals comprises the step of computing a squared value.

9. A method for measuring performance data from a plurality of components in a sampled amplitude read channel for reading data from a magnetic medium, the read channel detects digital data from a sequence of discrete time sample values generated by sampling an analog signal from a magnetic read head positioned over the magnetic medium, said method for measuring comprising the steps of:

(a) measuring, within the read channel, a plurality of measurement signals generated by a read channel component;

(b) processing the measurement signals to generate at least one error value; and (c) outputting the error value to a microcontroller for use in calibrating at least one of the read channel components, wherein the step of processing the measurement signals comprises the step of comparing an operand value, responsive to the measurement signals, to a predetermined threshold value.

10. A method for measuring performance data from at least one component in a synchronous PRML class-IV read channel utilized in reading data from a magnetic medium, the read channel detects digital data from a sequence of discrete time sample values generated by sampling an analog signal from a magnetic read head positioned over the magnetic medium using at least one sliding threshold Viterbi detector having at least one sliding threshold, said method for measuring comprising the steps of:

(a) accumulating a confidence metric value proportional to a difference between the sample values processed by the Viterbi detector and the sliding threshold; and (b) accumulating a count value representing the number of confidence metric values accumulated.

11. The method as recited in claim 10, wherein the confidence metric is proportional to the value selected from the group consisting of a pre-metric value and a post-metric value, wherein:

(a) the pre-metric value is computed, when a current sample value processed by the Viterbi detector is outside of the sliding threshold, responsive to a difference between the current sample value and the sliding threshold; and (b) the post-metric value is computed, when a current sample value processed by the Viterbi detector is within the sliding threshold, responsive to a minimum of a previous post-metric value and a difference between the current sample value and the sliding threshold.

12. The method as recited in claim 10, further comprising the step of generating expected sample values relative to the sample values read by the read channel, and wherein the confidence metric is proportional to the value selected from the group consisting of a pre-metric value and a post-metric value, wherein:

(a) the pre-metric value is computed, when an expected sample value is non-zero, responsive to a difference between a current sample value and the sliding threshold; and (b) the post-metric value is computed, when an expected sample value is zero, responsive to a minimum of a previous post-metric value and a difference between a current sample value and the sliding threshold.

* * * * *